UNITED STATES PATENT OFFICE.

CARLETON ELLIS AND ALFRED A. WELLS, OF MONTCLAIR, NEW JERSEY.

COATING COMPOSITION.

1,179,413.   Specification of Letters Patent.   Patented Apr. 18, 1916.

No Drawing.   Application filed August 13, 1912.   Serial No. 714,813.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Coating Compositions, of which the following is a specification.

This invention relates to a composition of matter adapted for use as a vehicle for painting concrete and cement structures of divers sorts and relates particularly to a composition containing rubber resin, all as more fully hereinafter described and claimed.

Concrete made from Portland cement is ordinarily rather porous and lacking in waterproof qualities; also it has a grayish brown tint as usually prepared which, for certain purposes is not desired. The cement used in the concrete contains a considerable amount of alkali in the form of free lime, or lime in loose combination; also potash or soda in basic form. In addition, bodies of a more or less water soluble nature are present and these compounds, under the action of moisture tend to migrate from the interior of the concrete mass and appear on the surface thereof as a white efflorescence known by the artisan as "saltpeter" or lime stains. These are very unsightly and often greatly injure the appearance of buildings, such as dwelling houses constructed of solid or monolithic concrete and stucco. Moreover, the surface of concrete often undergoes a slight disintegration, known as checking, which renders the surface unsightly, so for these and other reasons, concrete surfaces frequently need to be painted.

The basis of ordinary paint, linseed oil, is not adapted for use in the painting of concrete. Linseed oil, being a readily saponifiable oil, is affected by the alkalis of the cement and is decomposed rather rapidly. With the idea of overcoming these difficulties, proposals have been made to treat the surface of the concrete, prior to painting, with an acid, or neutralizing wash, such as aqueous solutions of hydrochloric and sulfuric acids, zinc sulfate, ammonium carbonate and the like. In addition to the time required to apply such a wash, the work has to be delayed in order to permit the water to dry out before the paint is applied and the surface of the cement, because of such drastic acid treatment, is oftentimes more or less disintegrated, the bonding of the cement is in a measure destroyed, especially at the surface, leading to scaling and checking. This action is enhanced by the action of frost in winter and may lead to a very great deterioration of the painted surface. Then too, there is always danger that alkalis from the interior of the cement mass may find their way to the surface of the mass and affect the paint coating by saponifying action; for the neutralizing action of the acid wash is only superficial at best, leaving the interior of the cement with its full quota of unneutralized alkali. For this and other reasons linseed oil has not found favor in the painting of concrete.

Solutions of ordinary varnish gums, such as Manila or kauri copal in turpentine and other solvents have also been suggested, but these also are saponifiable to a very considerable degree and are open in a large measure to the same objections noted in the case of linseed oil.

Our invention has to do with paint vehicles which essentially are substantially free from binding materials affected by the alkalis of cement, and comprises the use of resins, or resinous materials extracted from rubber gums and in particular the rubber gum known as jelutong.

Different qualities of jelutong are known in the trade, according to the source from which they are derived, as Palembang, (Sumatra) Pontianak, (Borneo), Sarawak, and the like. Commercial jelutong is obtained by coagulating the latex derived from the jelutong tree. Commercial jelutong contains roughly about 70% water, and 30% solid material, the latter consisting of about one-third rubber and two-thirds resin, so that for about each pound of rubber recovered, about two pounds of resin are obtained. The resin has found but few uses, and has constituted a waste, or by-product of considerable magnitude.

The process of deresination as now practised by the aid of solvents, leaves the resin in the form of a mass of white particles, or friable lumps, usually containing some moisture and the method of treatment for rendering this resin suitable as a basis for concrete paint vehicles, or oils, will shortly be described.

Chute has called attention to the difficulty of utilizing Pontianak rubber resin, (*India Rubber World*, July 1st, 1909) and has given some data as to the properties of this resin. His data as to the solutions of this resin coincide to a considerable extent with our own observations, except that no mention has been made by Chute of the instability of many of the solutions of resin. When first prepared, clear solutions are readily obtained, as for example, by melting one part of Pontianak rubber resin and thinning with two parts of petroleum naphtha. Such a clear solution is however, supersaturated and on keeping for a few weeks or months or even longer, separation of the less soluble portion occurs spontaneously and the former clear solution becomes largely a grayish paste, or solid mass. Most common solvents act in this way as the following tabulation indicates: For example, a clear liquid mixture made from equal parts of Pontianak resin and pine oil, on standing for a considerable period becomes solid; with one part resin and two parts pine oil, becomes about one-half filled with solid material; with one part resin and one part each of pine oil and solvent naphtha, nearly solid. Nearly solid products are produced on standing by mixing two parts of Pontianak resin with one part each of pine oil and heavy benzin, also two parts resin to two parts each of these solvents give like results. Light benzin, (varnish maker's benzin) with pine oil in varying proportions, acts in the same way. Equal parts of the resin and spirits of turpentine solidify as do mixtures composed of three and four parts of turpentine to two parts of resin. There is great uncertainty respecting the permanency of such solutions in storage. The solidification may occur in a few days or the solutions may retain their mobility and clarity for a long time to finally coagulate and become worthless as finish coating material. The various factors which enter into phenomena of spontaneous coagulation have not as yet been fully determined by us and we content ourselves for the present simply with calling attention to these observations.

In the present preparation of finish coatings, such as paint oils, varnishes and the like, concentrated solutions of resin are often required. For example, making rosin varnish known as the "gloss oil" type, five or six parts of ordinary rosin are used to four or five parts of benzin. With Pontianak rubber resin, ordinarily such concentrations would be impossible to secure.

In the manufacture of varnish from hard resins, it is quite customary to heat such resins to a temperature of 500 to 600 degrees F. in order to render them more suitable for combination with oils, etc. But in the case of Pontianak resin, it has been supposed that a temperature of 400 degrees could not be exceeded, owing to the formation of acetic acids and other supposedly injurious bodies. We have found, however, that for the proper transformation of Pontianak resin into a form desirable or suitable for the preparation of Pontianak oils or concrete coating vehicles, that temperatures above 600° to 700° F. are desirable. We have found that by heating the Pontianak resin in a retort having a reflux condenser so as to return to the condenser the products of distillation at temperatures at 675 to 700 degrees F. or higher, distillation takes place and the resin is converted to an acid body due to the formation of acetic acid and the like. By inserting a suitable dephlegmator the oily material may be returned to the still while the acetic and similar material is collected separately. By such differential concentration a substantially neutral resin can be secured whose physical properties depend upon the length of time of distillation. One hour's distillation treatment gives a mass which is firm but tacky; two hours' treatment gives a very thick but fluent mass. Four hours' treatment gives a liquid material of the consistency of molasses or thereabout. The latter product is readily soluble in heavy benzin in any proportion and affords a coating which is free from the objection of "frosting" mentioned above. Continuous heating in this manner also accomplishes another desirable purpose in that it decreases the unsaturated portion of the resin compound, the iodin number often doubling or tripling by such distillation treatment. This enables the compounds to acquire siccative properties, especially in the presence of a drier such as lead, or manganese resinate oleate or linoleate, or other suitable drying agents.

In order to secure a paint oil of the proper drying qualities, the mass after being distilled with a reflux condenser may be redistilled with a goose-neck still to yield limpid paint oils having drying properties. By fractionating these oils the lower boiling fractions or spirits containing isoprene and the like may be separated from the heavier oils. The latter in turn may be separated into light, medium and heavy paint oils which may be used for various purposes other than those indicated. These paint oils have the very desirable property of low degree of acidity, usually only traces or immaterial amounts of acid being present or the composition being entirely neutral. This is a great advantage in the manufacture of paints from basic pigments. The absence of fixed or non-volatile acid in these oils precludes the solidification or thickening of the pigment by such undesirable reaction as occurs in the case of ordinary resin or rancid paint oils.

A further advantage of such substantially neutral paint or paint oils is that when applied to concrete no reaction with the lime of the cement occurs after the coating has been applied and dried. In the case of concrete coatings containing acid bodies of certain type, drying takes place before reaction between the lime and acid is complete and the subsequent completion of the reaction with apparent change of volume has a tendency to cause rupturing of the paint film.

These resinous bodies contain a certain amount of saponifiable material which is very inert to the action of alkali, but difficulties may occur under certain conditions of treatment when acid bodies are formed giving the composition in acid value calculated as oleic acid of one-fourth to one-half of one per cent. To avoid the presence of objectionable amounts of acid material, we prefer to filter the product through a tower containing granular quick lime in order that from the solution we may remove any traces of acid material capable of uniting with lime. Thus a coating material is provided which affords very permanent, tenacious coatings. In a similar manner a small amount of lime may be added to the kettle or retort while preparing the composition. Or after manufacturing, the oil may be agitated while still warm with quick lime or hydrated lime. Solutions of the resin suitable as paint vehicles may be made in the following way. 125 pounds of Pontianak resin is heated for about four hours in a still provided with a reflux air condenser for the return of the oil and having a water-cooled down turning condenser connected with the reflux condenser so as to remove from the mass undergoing distillation the volatile acids as fast as they are formed. This enables a reaction in the resin conducive to increased drying properties and the like to take place with greater ease and we regard this step as an important feature of our procedure. At the end of four hours the resin is run from the retort and thinned with any suitable solvent such as benzol, benzin, turpentine, wood-turpentine, texene which is a variety of heavy benzin, solvent naphtha, toluol and the like. A thinner such as heavy benzin which is a very poor solvent for the normal resin is capable of readily reducing the fluent material to concentrations to 50 or 60% without danger of separation of the resin. After being treated in this manner the solution if dark colored may be bleached if desired by filtration through fullers' earth, or bone-black, or by treatment with chemical bleaching agents such as chlorin and its compounds having bleaching properties; also such bodies as sodium peroxid, ozone, and the like.

Solutions of the fluent mass may be incorporated if desired with other drying oils and driers, including fish, linseed, china wood, corn and soya bean oils. Ten to twenty per cent. of China wood oil added to the limpid oils obtained by rectification of the distilled resin form a very useful composite paint oil. The treatment of the resin at these high temperatures may take place if desired at reduced atmospheric pressures. The temperature and length of heat treatment under such circumstances depend upon the amount of reduction of atmospheric pressure prevailing.

The solution may be thickened if desired with various colloidal or other thickeners, including such compounds as aluminum and lime soaps of fish oil, wood oil and the like, or the corresponding oleates and linoleates. Rubber also may be introduced as a thickening agent and wax such as ceresin, or beeswax may be employed especially to afford a flat drying composition.

It should be understood that we do not wish to limit ourselves to the precise ingredients described in the foregoing but may invoke the doctrine of equivalency as far as the same may be herein applicable. For example, additions of saponifiable resins, such as kauri copal may be made to a greater or less extent depending upon the age of the concrete and on the mass or relative proportion of unsaponifiable resin present. A large amount of Pontianak resin may embed, as it were, a small amount of colophony or kauri and thus for a long time protect these more susceptible bodies from the action of alkali.

What we claim is:

1. As an oily product a fluent resin comprising substantially unsaponifiable non-volatile liquid rubber resin.

2. As a new product an oil of rubber resin having somewhat siccative properties.

3. As a new product an oil of Pontianak rubber resin of a substantially unsaponifiable character.

4. As a new product the oil of Pontianak rubber resin.

Signed at Montclair, in the county of Essex and State of New Jersey, this 8th day of August, A. D. 1912.

CARLETON ELLIS.
A. A. WELLS.

Witnesses:
I. DAVID LUBETZKI,
A. H. NEY.